(12) United States Patent
Noro et al.

(10) Patent No.: US 11,305,764 B2
(45) Date of Patent: Apr. 19, 2022

(54) OBJECT DETECTION APPARATUS

(71) Applicant: DENSO CORPORATION, Kariya (JP)

(72) Inventors: Satoru Noro, Kariya (JP); Masakazu Takeichi, Kariya (JP); Takuya Nomura, Kariya (JP)

(73) Assignee: DENSO CORPORATION, Kariya (JP)

( * ) Notice: Subject to any disclaimer, the term of this patent is extended or adjusted under 35 U.S.C. 154(b) by 486 days.

(21) Appl. No.: 16/330,573

(22) PCT Filed: Aug. 28, 2017

(86) PCT No.: PCT/JP2017/030806
§ 371 (c)(1),
(2) Date: Mar. 5, 2019

(87) PCT Pub. No.: WO2018/047663
PCT Pub. Date: Mar. 15, 2018

(65) Prior Publication Data
US 2021/0291824 A1 Sep. 23, 2021

(30) Foreign Application Priority Data
Sep. 7, 2016 (JP) .............................. JP2016-174998

(51) Int. Cl.
*B60W 30/09* (2012.01)
*B60R 19/48* (2006.01)
(Continued)

(52) U.S. Cl.
CPC ....... *B60W 30/0956* (2013.01); *B60R 19/483* (2013.01); *B60W 30/09* (2013.01);
(Continued)

(58) Field of Classification Search
CPC ............. B60W 30/0956; B60W 30/09; B60W 2420/54; B60W 2554/4044; G08G 1/166;
(Continued)

(56) References Cited

U.S. PATENT DOCUMENTS 7,889,072 B2 * 2/2011 Ishikawa ............. G01S 7/52004
340/539.24
9,457,753 B2 * 10/2016 Freienstein ........... G01S 13/874
(Continued)

FOREIGN PATENT DOCUMENTS

JP 2004-085258 A 3/2004
JP 2006216660 A 8/2006
(Continued)

*Primary Examiner* — Tyler J Lee
(74) *Attorney, Agent, or Firm* — Maschoff Brennan

(57) ABSTRACT

An object detection apparatus applied to a vehicle having a sensor unit mounted on a predetermined member provided to the vehicle, the sensor unit being provided with an object detection sensor that detects position information of an object present around the vehicle and a tilt sensor that detects a tilt angle as inclination with respect to a predetermined direction, and performing a process of detecting the object based on the position information of the object detected by the object detection sensor, the object detection apparatus comprising a detachment state determination section that determines a detachment state of the predetermined member based on the tilt angle detected by the tilt sensor.

14 Claims, 4 Drawing Sheets

(51) Int. Cl.
  *G01S 7/52* (2006.01)
  *G08G 1/16* (2006.01)
  *B60W 30/095* (2012.01)
  *G01S 13/931* (2020.01)
  *G01S 7/40* (2006.01)

(52) U.S. Cl.
  CPC .......... *G01S 7/52004* (2013.01); *G08G 1/166* (2013.01); *B60W 2420/54* (2013.01); *B60W 2554/4044* (2020.02); *G01S 7/40* (2013.01); *G01S 7/4034* (2021.05); *G01S 13/931* (2013.01); *G01S 2013/9323* (2020.01); *G01S 2013/9324* (2020.01)

(58) Field of Classification Search
  CPC ............... B60R 19/483; G01S 7/52004; G01S 2013/9323; G01S 7/4034; G01S 7/40; G01S 2013/9324; G01S 13/931
  See application file for complete search history.

(56) References Cited

U.S. PATENT DOCUMENTS

| | | | | |
|---|---|---|---|---|
| 2006/0185923 | A1* | 8/2006 | Tanabe | B60R 21/0136 180/274 |
| 2007/0005609 | A1* | 1/2007 | Breed | B60N 2/2863 |
| 2007/0021915 | A1* | 1/2007 | Breed | G08G 1/164 701/301 |
| 2007/0222575 | A1* | 9/2007 | Kawashima | B62J 27/00 340/476 |
| 2009/0024350 | A1* | 1/2009 | Suzuki | G01C 9/00 702/141 |
| 2009/0050394 | A1* | 2/2009 | Takahashi | B60R 21/0134 180/274 |
| 2009/0066494 | A1* | 3/2009 | Ishikawa | G01S 7/529 340/438 |
| 2011/0309967 | A1* | 12/2011 | Choe | G01S 17/87 342/54 |
| 2012/0259479 | A1* | 10/2012 | Yoneta | G07C 5/08 701/1 |
| 2015/0329072 | A1 | 11/2015 | Freienstein et al. | |
| 2016/0264179 | A1* | 9/2016 | Tomizawa | B62D 25/14 |
| 2016/0291132 | A1 | 10/2016 | Goto et al. | |
| 2017/0102704 | A1* | 4/2017 | O'Brien | G05D 1/027 |
| 2017/0178512 | A1* | 6/2017 | Kannon | G07C 5/08 |
| 2017/0299720 | A1 | 10/2017 | Matsuura et al. | |

FOREIGN PATENT DOCUMENTS

| | | |
|---|---|---|
| JP | 2453043 A | 3/2009 |
| JP | 2009-074810 A | 4/2009 |
| JP | 2009067156 A | 4/2009 |
| JP | 2010-127743 A | 6/2010 |
| JP | 2011-199988 A | 10/2011 |
| JP | 2016-503503 A | 2/2016 |

\* cited by examiner

FIG.2
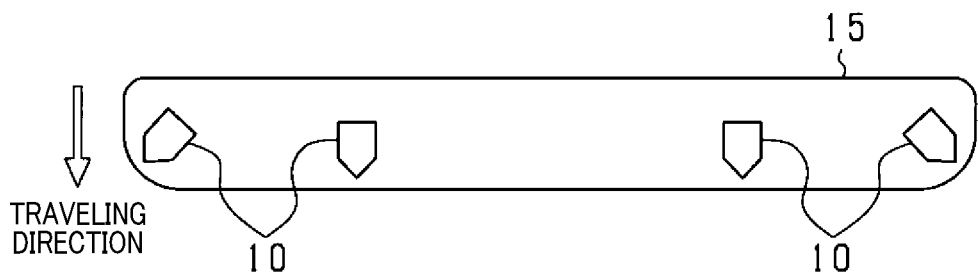
FIG.3
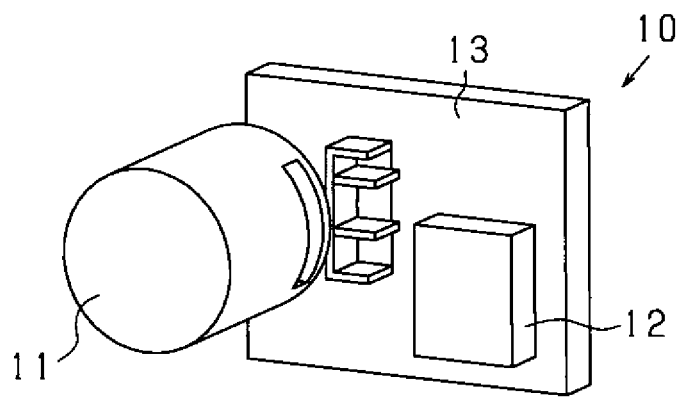
FIG.4
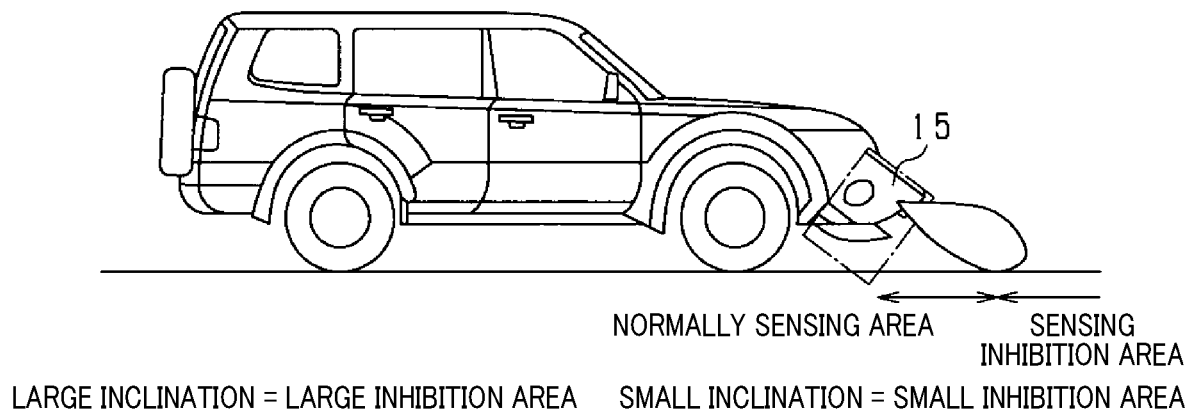
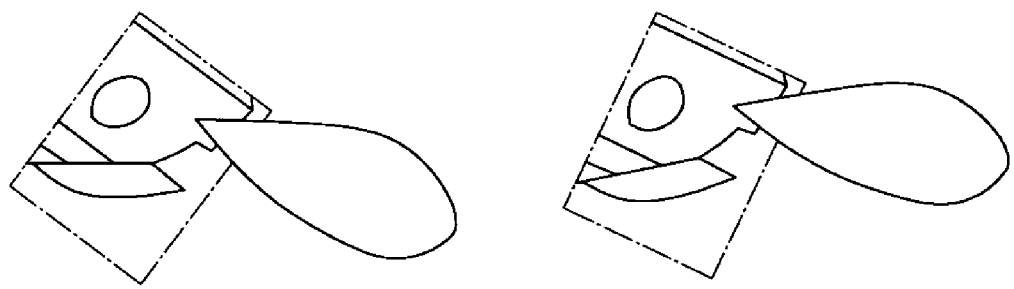

OBJECT DETECTION APPARATUS

CROSS-REFERENCE TO RELATED APPLICATION

The present application is a national stage application of PCT Application No. PCT/JP2017/030806, filed on Aug. 28, 2017, which claims priority to Japanese Patent Application No. 2016-174998 filed on Sep. 7, 2016, the entire contents of which are incorporated herein by reference. Also, any applications for which a foreign or domestic priority claim is identified in the Application Data Sheet as filed with the present application are hereby incorporated by reference under 37 CFR 1.57.

TECHNICAL FIELD

The present disclosure relates to an object detection apparatus that detects an object.

BACKGROUND ART

A driving assistance apparatus is conventionally known which is installed in a vehicle and detects an object present in front of or behind the vehicle to issue a command for warning or automatic braking. Many such driving assistance apparatuses of this type detect an object present in front of or behind a vehicle based on a reflected wave that is a millimeter wave, an ultrasonic wave, or the like emitted by a sensor as a transmission wave and reflected by the object. Among such sensors, an ultrasonic sensor that emits an ultrasonic wave as a transmission wave is held, for example as described in PTL 1, by a holding member so as to be held at a predetermined position of a bumper.

CITATION LIST

Patent Literature

[PTL 1] JP 2009-074810 A

SUMMARY OF THE INVENTION

In a configuration as described in PTL 1 where an ultrasonic sensor is held at a predetermined position of a bumper, removal of fixation of the bumper to the vehicle (detachment of the bumper from the vehicle) is assumed to cause inclination of the ultrasonic sensor held at the predetermined position of the bumper in association with the bumper detachment. In this case, there is a risk of a decrease in object detection accuracy of the ultrasonic sensor.

The present disclosure has been made to solve the above problems and it is a major object thereof to provide an object detection apparatus capable of determining a detachment state of a predetermined member in a vehicle in which an object detection sensor is installed which is mounted on the predetermined member provided to the vehicle.

The present disclosure is an object detection apparatus applied to a vehicle having a sensor unit mounted on a predetermined member provided to the vehicle, the sensor unit being provided with an object detection sensor that detects position information of an object present around the vehicle and a tilt sensor that detects a tilt angle as inclination with respect to a predetermined direction, and performing a process of detecting the object based on the position information of the object detected by the object detection sensor, the object detection apparatus comprising a detachment state determination section that determines a detachment state of the predetermined member based on the tilt angle detected by the tilt sensor.

Removal of fixation of the predetermined member having the sensor unit mounted thereon causes detachment of the predetermined member from the vehicle, leading to inclination of the object detection sensor provided to the sensor unit mounted on the predetermined member in association with the detachment of the predetermined member. In this regard, the sensor unit provided with the object detection sensor includes a tilt sensor. This causes, if the object detection sensor provided to the sensor unit mounted on the predetermined member is inclined in association with detachment of the predetermined member, inclination of the tilt sensor provided to the sensor unit with reference to a predetermined direction to the same extent as the object detection sensor. The detachment state determination section is thus capable of determining a detachment state of the predetermined member based on the tilt angle detected by the tilt sensor.

BRIEF DESCRIPTION OF DRAWINGS

The present disclosure will be clearer on the above object, other objects, characteristics, and advantages from the detailed description below with reference to the appended drawings. The drawings are as follows:

FIG. 2 is a schematic diagram illustrating a plan view of a state where sensor units are mounted on a bumper;

FIG. 3 is a schematic configuration diagram of the sensor unit;

FIG. 4 is a diagram illustrating a change, when the bumper is in a semi-detachment state, in a detection direction of an ultrasonic sensor that changes in accordance with a degree of coming off of the bumper;

DESCRIPTION OF EMBODIMENTS

Figure 1:
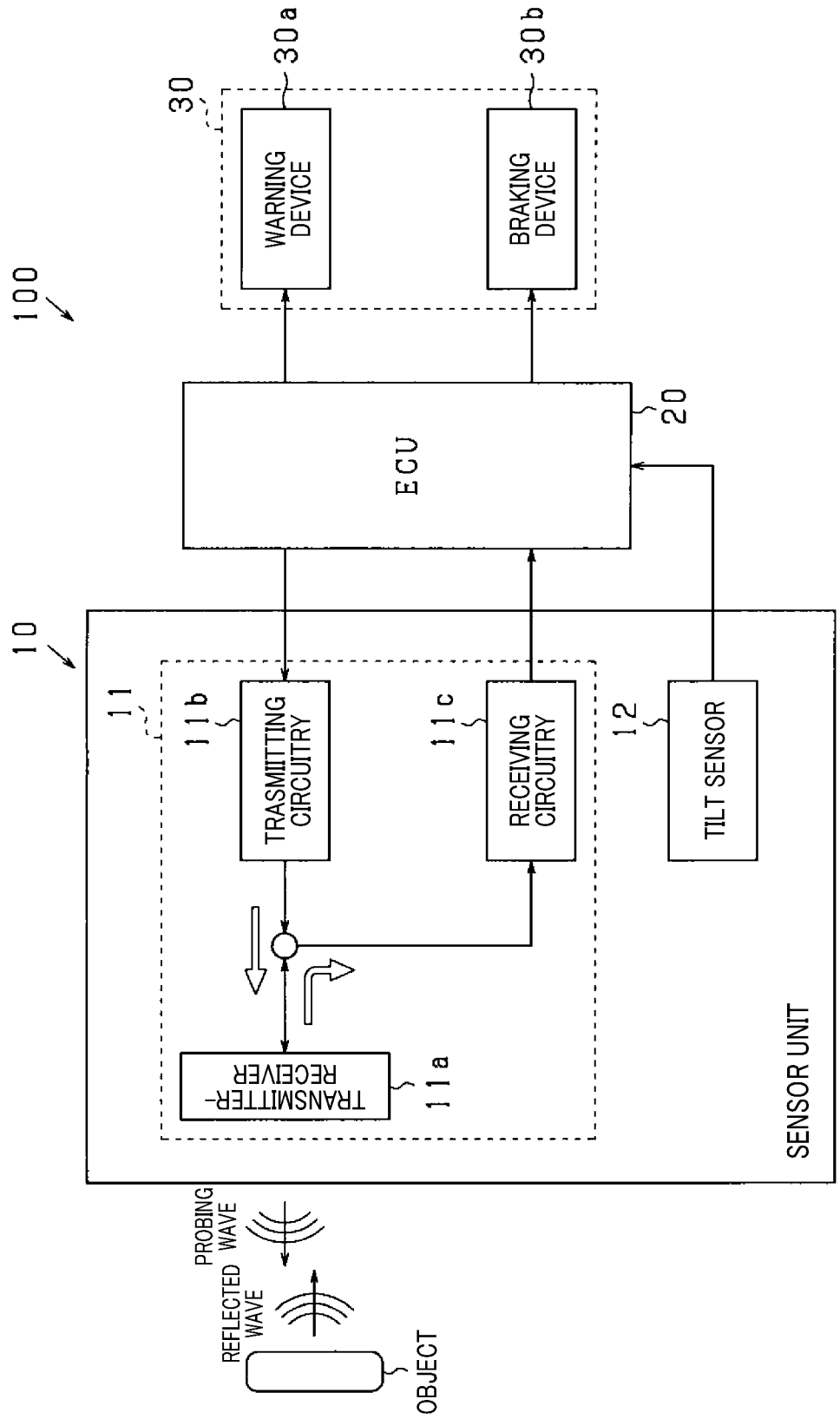
FIG. 1 is a schematic configuration diagram of a driving assistance apparatus according to an embodiment.

A driving assistance apparatus 100 illustrated in FIG. 1 is installed in a vehicle (own vehicle) and senses an object present around the own vehicle, for example, in a traveling direction of the own vehicle, to perform driving assistance control. The driving assistance control performs control to avoid a collision with an object or to reduce collision damage.

In FIG. 1, the driving assistance apparatus 100 is provided with a sensor unit 10, an ECU 20, and a driving assistance processing section 30.

Among them, a plurality of sensor units 10 are mounted on a bumper (equivalent to a predetermined member) 15 illustrated in FIG. 2. Such bumpers 15 are provided to a front end and rear end of the vehicle, and four such sensor units 10 are arranged in alignment with a vehicle width direction on the respective bumpers 15. A plurality of portions of the bumpers 15 are fixed with locking members and the like.

Back to the description of FIG. 1. Each sensor unit 10 is provided with an ultrasonic sensor (equivalent to an object detection sensor) 11 and a tilt sensor 12.

The ultrasonic sensor 11 is provided with a transmitter-receiver 11a that transmits an ultrasonic wave and receives a reflected wave reflected by an object present around the own vehicle, a transmitting circuitry 11b, and a receiving circuitry 11c. The transmitting circuitry 11b is electrically connected to the transmitter-receiver 11a, and applies an electrical signal to the transmitter-receiver 11a at predetermined control cycles, whereby the transmitter-receiver 11a transmits an ultrasonic wave ahead of or behind the own vehicle in the traveling direction. The receiving circuitry 11c is electrically connected to the transmitter-receiver 11a and detects the reflected wave received by the transmitter-receiver 11a as an electrical signal.

The tilt sensor 12 is described later.

The ECU 20 is electrically connected to the transmitting circuitry 11b and the receiving circuitry 11c. The ECU 20 directs the transmitting circuitry 11b to output an electrical signal to the transmitter-receiver 11a at predetermined control cycles. Meanwhile, the ECU 20 receives the electrical signal detected by the receiving circuitry 11c. The magnitude of the signal is proportional to the intensity of the reflected wave, and the reflected wave has the intensity changed depending on a distance between the own vehicle and an object present around the own vehicle. The position information of the object present around the own vehicle can thus be detected based on the magnitude of the electrical signal received from the receiving circuitry 11c. When the position information of the object is detected, the distance from the own vehicle to the object is calculated from the detected position information of the object and the position of the own vehicle. The ECU 20 then causes the driving assistance processing section 30 to perform prescribed driving assistance process based on the calculated distance from the own vehicle to the object.

In the present embodiment, the driving assistance process is equivalent to a warning process for alerting a driver to the presence of an object that may collide with the own vehicle and a braking process for braking the own vehicle. The driving assistance processing section 30 is accordingly provided with a warning device 30a and a braking device 30b.

The warning device 30a is a speaker or a display installed inside the own vehicle. When the ECU 20 determines that the distance from the own vehicle to the object is shorter than a first predetermined distance to increase a probability of a collision of the own vehicle with the object, the warning device 30a outputs a warning sound, a warning message, or the like in response to a control command from the ECU 20 to alert the driver to the danger of a collision.

The braking device 30b is a braking device that brakes the own vehicle. When the ECU 20 determines that the distance from the own vehicle to the object is shorter than a second predetermined distance set shorter than the first predetermined distance, and the probability of a collision of the own vehicle with the object is increased, the braking device 30b is actuated in response to the control command from the ECU 20. Specifically, a braking force for braking operation by the driver is increased (braking assistance function) or, if braking operation is not performed by the driver, automatic braking is carried out (automatic braking function).

In a vehicle in which the driving assistance apparatus 100 having the above configuration is installed, removal of fixation of the bumper 15 on which the sensor units 10 are mounted and detachment of the bumper 15 from the vehicle cause inclination of the ultrasonic sensors 11 provided to the sensor units 10 mounted on the bumper 15 due to the detachment of the bumper 15. In this case, there is a risk of a decrease in object detection accuracy of the ultrasonic sensors 11.

To cope with this situation, each sensor unit 10 is provided with the tilt sensor 12. More specifically, as illustrated in FIG. 3, the tilt sensor 12 is attached to the same substrate 13 as the ultrasonic sensor 11 is attached to configure the sensor unit 10. Accordingly, if detachment of the bumper 15 causes inclination of the ultrasonic sensor 11 provided to the sensor unit 10, the tilt sensor 12 attached to the same substrate 13 as the ultrasonic sensor 11 is attached is inclined to the same extent as the ultrasonic sensor 11. A detachment state of the bumper 15 can thus be determined based on a roll angle $\theta r$ or a pitch angle $\theta p$, described later, detected by the tilt sensor 12.

The tilt sensor 12 is a sensor that detects inclination of the substrate 13 with respect to a horizontal plane. The horizontal plane in this context means a plane perpendicular to the direction of the gravity. The tilt sensor 12 is a known biaxial tilt sensor that resolves the inclination of the substrate 13 with respect to the horizontal plane into respective angles of rotation to two axes (referred to as an X0 axis and a Y0 axis) orthogonal to each other for detection. The biaxial tilt sensor may be achieved using a triaxial accelerometer or may be achieved by combining a pendulum with a magnetometer.

In the present embodiment, the tilt sensor 12 is attached to the substrate 13 in such a manner that the axial direction of the X0 axis is identical to the detection direction of the ultrasonic sensor 11, and the sensor units 10 are mounted on the bumpers 15 in such a manner that the Y0 axis is in a direction identical to the horizontal direction. The angle of rotation about the X0 axis (referred to as the roll angle $\theta r$) detected by the tilt sensor 12 represents a tilt angle in a width direction of a vehicle body, and the angle of rotation about the Y0 axis (referred to as the pitch angle $\theta p$) represents a tilt angle in a longitudinal direction of the vehicle body.

In the present embodiment, as an example, a road surface on which the own vehicle travels is assumed to be horizontal. When the own vehicle is on the horizontal road surface except for special circumstances such as an unbalanced pneumatic pressure of respective tires provided to the own vehicle, both the roll angle $\theta r$ and the pitch angle $\theta p$ detected by the tilt sensor 12 are 0 degrees.

Back to the description on FIG. 1. The tilt sensor 12 sequentially outputs a signal representing the roll angle $\theta r$ and a signal representing the pitch angle $\theta p$ to the ECU 20. For the convenience of the description, the later description is focused on determination of detachment of the bumper 15 provided to the front end of the vehicle. The roll angle $\theta r$ detected by the tilt sensor 12 provided to the sensor unit 10 mounted on the bumper 15 provided to the front end of the vehicle expresses an angle of rotation in a right-handed screw direction with reference to the X0 axis (an angle of rotation downward with reference to the width direction of the vehicle from a neutral state) as a positive value and expresses an angle of rotation in the opposite direction as a negative value. The pitch angle $\theta p$ expresses an angle of rotation in a right-handed screw direction with reference to the Y0 axis from a neutral state (an angle of rotation downward with reference to the longitudinal direction of the vehicle from the neutral state) as a positive value and expresses an angle of rotation in the opposite direction as a negative value.

In the present embodiment, the ECU 20 determines, prior to the determination of detachment of the bumper 15, whether the sensor unit 10 has been detached from the bumper 15. In association with vibration of the own vehicle while traveling or the like, the sensor unit 10 itself attached to the bumper 15 may be detached from the bumper 15, causing the sensor unit 10 to be hung by a circuit wire and the like for connection to the ECU 20. When the sensor unit 10 is detached from the bumper 15 in such a manner, at least one tilt angle of the roll angle θr and the pitch angle θp detected by the tilt sensor 12 provided to the detached sensor unit 10 is markedly different from tilt angles detected by the tilt sensors 12 included in the other sensor units 10. Accordingly, in the present embodiment, a determination is made whether a difference between the pitch angle θp detected by a certain tilt sensor 12 and the pitch angles θp detected by the other tilt sensors 12 is greater than a first predetermined value. If a determination is made that there is the tilt sensor 12 having detected the pitch angle θp with a difference from the pitch angles θp detected by the other tilt sensors 12 greater than the first predetermined value, the sensor unit 10 provided with the tilt sensor 12 is then determined to have been detached from the bumper 15.

If a determination is made that there is the detached sensor unit 10 among the sensor units 10 mounted on the bumper 15, the ultrasonic sensor 11 provided to the sensor unit 10 determined to have been detached has a risk of erroneously recognizing the road surface as an object to detect position information. Accordingly, if a determination is made that there is the detached sensor unit 10 among the sensor units 10 mounted on the bumper 15, an object detection process is stopped that is based on the position information of an object detected by the ultrasonic sensor 11 provided to the sensor unit 10 determined to have been detached. More specifically, even when receiving an electrical signal transmitted from the receiving circuitry 11c provided to the sensor unit 10 determined to have been detached, the ECU 20 does not perform the process of detecting an object based on the electrical signal. Even when the ultrasonic sensor 11 provided to the sensor unit 10 in a detached state erroneously recognizes the road surface as an object, the object detection can thus be inhibited based on the position information sent from the ultrasonic sensor 11.

On condition that no detached sensor unit 10 has been determined to be among the sensor units 10 mounted on the bumper 15, the ECU 20 determines the detachment state of the bumper 15 based on the roll angle θr or the pitch angle θp detected by the tilt sensor 12. The determination of the detachment state of the bumper 15 is thus made in a state where not even a single sensor unit 10 mounted on the bumper 15 is detached from the bumper 15. After determining detachment of the bumper 15, the ECU 20 changes object detection control based on the electrical signal received from the receiving circuitry 11c in accordance with the determined detachment state of the bumper 15. The ECU 20 is thus equivalent to a detachment state determination section, a change section, and a sensor detachment determination section.

The detachment state of the bumper 15 is classified into a full-detachment state, a semi-detachment state, and a one-side detachment state. The following description is given to each detachment state of the bumper 15, a determination method for each, and contents of the change in the object detection control in accordance with the detachment state of the bumper 15.

The full-detachment state of the bumper 15 means a state where all fixation of the bumper 15 to the own vehicle has been lost to cause the bumper 15 to be detached from the vehicle and the entire bumper 15 to be hung by a wire or the like. In this situation, the bumper 15 is assumed to be hung with an external surface of the bumper 15 downward. In this case, in association with the hanging of the bumper 15, the pitch angles θp detected by the respective tilt sensors 12 provided to the sensor units 10 mounted on the bumper 15 increase in the positive direction. The bumper 15 is thus determined to be in the full-detachment state if the pitch angles θp detected by the respective tilt sensors 12 provided to the sensor units 10 mounted on the bumper 15 are greater than a first positive predetermined angle (e.g., 70°).

If the bumper 15 is determined to be in the full-detachment state, the bumper 15 is assumed to be hung with the external surface of the bumper 15 downward. The ultrasonic sensor 11 provided to the sensor unit 10 mounted on the bumper 15 is thus not capable of detecting an object, such as another vehicle present around the own vehicle and also has a risk of erroneously recognizing the road surface as an object to detect position information. If determining that the bumper 15 is in the full-detachment state, even when receiving an electrical signal transmitted from the respective receiving circuitry 11c provided to any sensor unit 10 mounted on the bumper 15 determined to be in the full-detachment state, the ECU 20 thus does not perform the object detection process based on the electrical signal. This stops the object detection process based on the position information of the objects detected by the respective ultrasonic sensors 11 provided to the sensor units 10 mounted on the bumper 15 determined to be in the full-detachment state. This allows the respective ultrasonic sensors 11 provided to the sensor units 10 mounted on the bumper 15 determined to be in the full-detachment state to inhibit erroneous recognition of the road surface as an object and detection of position information.

The semi-detachment state of the bumper 15 means a state where fixation on an upper side of the bumper 15 has been lost while a lower side of the bumper 15 remains fixed. In this state, the upper side of the bumper 15 hangs down and, with this, the sensor units 10 mounted on the bumper 15 incline in a direction of the road surface. In this case, the pitch angles θp detected by tilt sensors 12 provided to the sensor units 10 mounted on the bumper 15 in the semi-detachment state are greater in comparison with the pitch angles θp detected by the tilt sensors 12 provided to the sensor units 10 mounted on the normal bumper 15 not in the detachment state. Meanwhile, the pitch angles θp detected by the tilt sensor 12 provided to the sensor units 10 mounted on the bumper 15 in the semi-detachment state are assumed to be smaller in comparison with the pitch angles θp detected by the tilt sensors 12 provided to the sensor units 10 mounted on the bumper 15 in the full-detachment state.

Accordingly, if the pitch angles θp detected by the respective tilt sensors 12 provided to the sensor units 10 mounted on the bumper 15 are greater than a second positive predetermined angle and smaller than a first predetermined angle, the bumper 15 is determined to be in the semi-detachment state. In this situation, the second predetermined angle is set to a value (e.g., from 45° to 50°) smaller than the first predetermined angle and greater than an upper limit of the pitch angle θp assumed to be detected by the tilt sensors 12 provided to the sensor units 10 mounted on the normal bumper 15 not in the detachment state.

If the bumper 15 is determined to be in the semi-detachment state, the bumper 15 is assumed to have the upper side come off. That is, as illustrated in FIG. 4, in association with coming off of the upper side of the bumper 15, the ultrasonic sensor 11 is considered to change the detection direction to a road surface side relative to the normal detection direction. In this situation, a large degree of coming off of the bumper 15 (large inclination of the ultrasonic sensor 11) causes the ultrasonic sensor 11 to transmit an ultrasonic wave to the road surface and has a risk of sending the position information of the road surface as the position information of an object to the ECU 20. Meanwhile, a small degree of coming off of the bumper 15 (small inclination of the ultrasonic sensor 11) results in small inclination in the detection direction of the ultrasonic sensor 11, which may allow detection of the position information of an object present in a short distance. Accordingly, if the bumper 15 is determined to be in the semi-detachment state, a detection upper limit distance as an upper limit of the distance for detecting the object is limited to be shorter as the pitch angle θp detected by the tilt sensor 12 provided to the sensor unit 10 mounted on the bumper 15 is greater. For an object outside the detection upper limit distance limited to be shorter, the object detection process is not performed based on the position information of the object detected by the ultrasonic sensor 11. Meanwhile, continuous detection of an object present within the detection upper limit distance is allowed based on the position information of the object detected by the ultrasonic sensor 11.

The one-side detachment state of the bumper 15 means a state where either a left or right side of the bumper 15 is detached. In this state, the sensor units 10 mounted on the detached side of the bumper 15 inclines downward in the width direction, and the roll angle θr detected by the tilt sensor 12 provided to the sensor unit 10 mounted on the detached side of the bumper 15 thus increases in the positive direction. If there is the tilt sensor 12 having detected the roll angle θr greater than a third predetermined angle (e.g., 45°), a determination is made that the bumper 15 is in the one-side detachment state and a portion on the sensor unit 10 side provided with the tilt sensor 12 having detected the roll angle θr greater than the third positive predetermined angle in the bumper 15 is detached. Since the undetached portion of the bumper 15 is fixed to the vehicle, the sensor units 10 mounted on the undetached side of the bumper 15 inclines less in the width direction of. That is, the bumper 15 is deformed to tilt the detached side of the bumper 15 downward.

If the bumper 15 is in the one-side detachment state, the sensor unit 10 mounted on the portion on the detached side of the bumper 15 gets closer to the road surface and there is a possibility that the transmitter-receiver 11a provided to the sensor unit 10 receives a reflected wave reflected by the road surface. In this case, the ECU 20 has a risk of detecting the road surface as an object. If the bumper 15 is determined to be in the one-side detachment state, the object detection process is thus stopped which is based on the position information of an object detected by the ultrasonic sensor 11 provided to the sensor unit 10 mounted on the portion on the detached side of the bumper 15 (the ultrasonic sensor 11 provided to the sensor unit 10 provided with the tilt sensor 12 having detected the roll angle θr greater than the third predetermined angle). This inhibits the ultrasonic sensor 11 provided to the sensor unit 10 mounted on the portion on the detached side of the bumper 15 from making erroneous recognition of the road surface as an object and detecting position information, and allows the ultrasonic sensor 11 provided to the sensor unit 10 mounted on the portion on the undetached side of the bumper 15 to continuously detect position information of an object.

Figure 5:
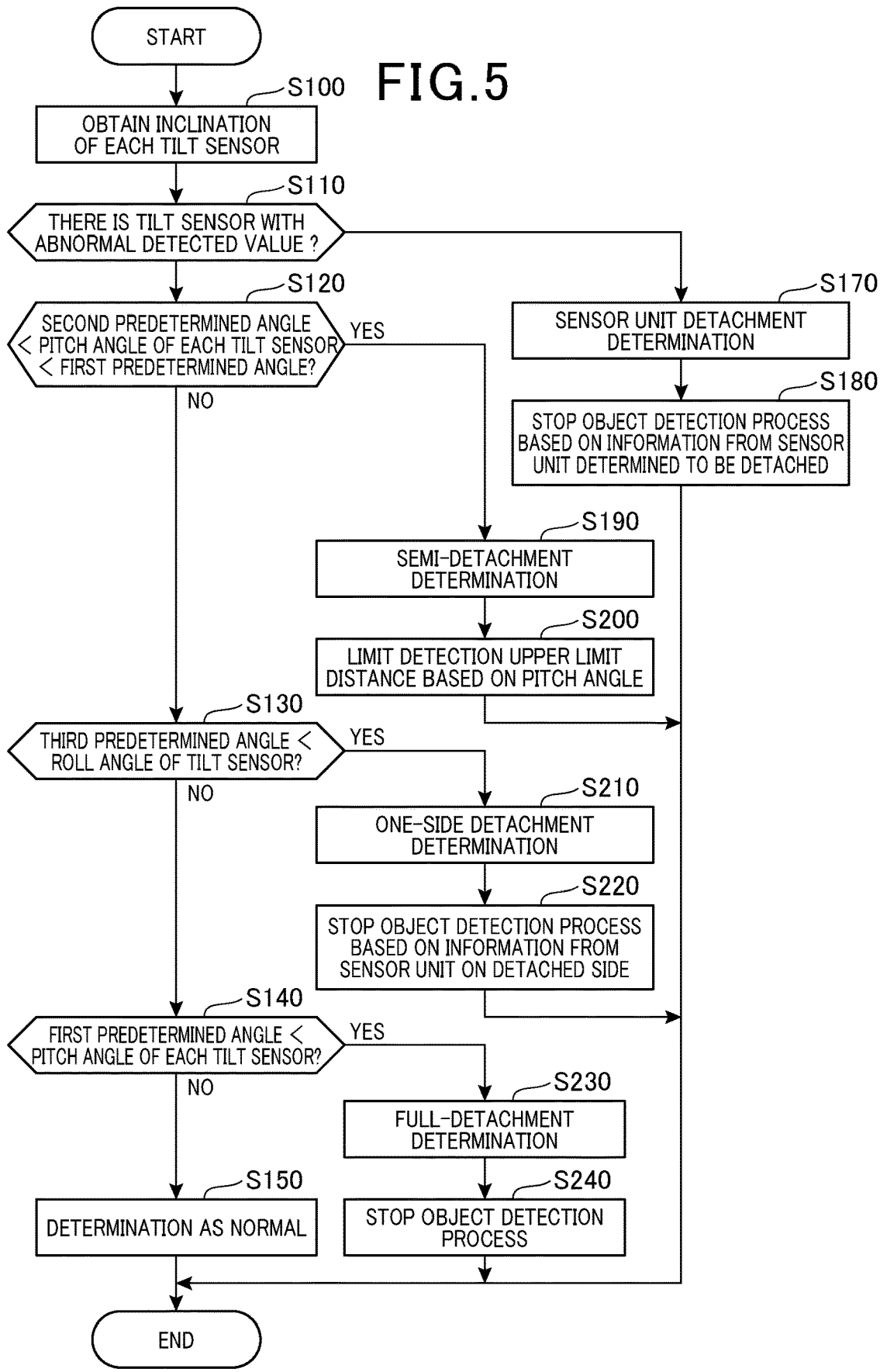
FIG. 5 is a flowchart illustrating control performed by an ECU according to the present embodiment.

In the present embodiment, the ECU 20 performs detachment determination control for the bumper 15 illustrated in FIG. 5 described below. The detachment determination control for the bumper 15 illustrated in FIG. 5 is repeatedly performed at predetermined cycles by the ECU 20 while the ECU 20 is in a power-on state. The detachment determination control described below is assumed to perform the detachment determination control for the bumper 15 provided at the front end of the vehicle while the detachment determination control is also capable of being performed for the bumper 15 provided at the rear end of the vehicle in the same manner.

First, in step S100, from the respective tilt sensors 12 provided to the sensor units 10 mounted on the bumper 15, the roll angles θr and the pitch angles θp are obtained.

Then, in step S110, a determination is made whether there is the tilt sensor 12 having detected the pitch angle θp having a difference from the pitch angles θp detected by the other tilt sensors 12, the difference being greater than a predetermined value. If a YES determination is made by the determination process in step S110 (S110: YES), the present control proceeds to step S170 and the tilt sensor 12 having detected the pitch angle θp having a difference greater than the predetermined value from the pitch angles θp detected by the other tilt sensors 12 is determined to have detached from the bumper 15. In step S180, the object detection process is stopped which is based on the position information of an object sent from the ultrasonic sensor 11 provided to the sensor unit 10 determined to have been detached. The present control is then ended. If a NO determination is made by the determination process in step S110 (S110: NO), the present control proceeds to step S120.

In step S120, a determination is made whether the pitch angles θp detected by the respective tilt sensors 12 provided to the sensor units 10 mounted on the bumper 15 are smaller than the first predetermined angle and greater than the second predetermined angle. If a YES determination is made by the determination process in step S120 (S120: YES), the present control proceeds to step S190 and the bumper 15 is determined to be the semi-detachment state. In step S200, the detection upper limit distance is limited on the basis of the pitch angles θp obtained in step S100. The present control is then ended. If a NO determination is made by the determination process in step S120 (S120: NO), the present control proceeds to step S130.

In step S130, a determination is made whether there is the tilt sensor 12 having detected the roll angle θr greater than the third predetermined angle. If a YES determination is made by the determination process in step S130 (S130: YES), the present control proceeds to step S210. In step S210, the bumper 15 is determined to be in the one-side detachment state where the portion on the sensor unit 10 side provided with the tilt sensor 12 having detected the roll angle θr greater than the third positive predetermined angle is detached. In step S220, the object detection process is stopped which is based on the position information of an object detected by the ultrasonic sensor 11 provided to the sensor unit 10 mounted on the portion on the detached side of the bumper 15. The present control is then ended. If a NO determination is made by the determination process in step S130 (S130: NO), the present control proceeds on to step S140.

In step S140, a determination is made whether the pitch angles θp detected by the respective tilt sensors 12 provided to the sensor units 10 mounted on the bumper 15 are greater than the first predetermined angle. If a YES determination is made by the determination process in step S140 (S140: YES), the present control proceeds to step S230 and the bumper 15 is determined to be in the full-detachment state. At step S240, the object detection process is stopped based on the position information of an object detected by each ultrasonic sensor 11 provided to the sensor units 10 mounted on the bumper 15. The present control is then ended. If the determination process in step S140 is determined as NO (S140: NO), the process proceeds to step S150 and the bumper 15 is determined to be in the normal state to end the present control.

According to the above configuration, the present embodiment provides the following effects.

The sensor unit 10 is configured by attaching the tilt sensor 12 to the same substrate 13 as the ultrasonic sensor 11 is attached. If the ultrasonic sensor 11 provided to the sensor unit 10 is inclined by detachment of the bumper 15, the tilt sensor 12 attached to the same substrate 13 as the ultrasonic sensor 11 is attached thus inclines to the same extent as the ultrasonic sensor 11. The detachment state of the bumper 15 can thus be determined on the basis of the roll angle θr or the pitch angle θp detected by the tilt sensor 12.

Depending on the detachment state of the bumper 15, it is assumed not to allow normal performance of object detection based on the intensity of a reflected wave detected by the ultrasonic sensor 11 because of, for example, inclination of the sensor unit 10 in a direction of the road surface. To cope with this, in accordance with the detachment state of the bumper 15, the contents of the object detection process is changed which is on the basis of the position information of the object detected by the ultrasonic sensor 11. This allows an appropriate object detection process in accordance with the detachment state of the bumper 15.

The above embodiment may be performed by modifying it as follows.

In the above embodiment, the four sensor units 10 are arranged on the bumpers 15 in alignment with the vehicle width direction. In this regard, three or five or more sensor units 10 may be arranged on the bumpers 15 in alignment with the vehicle width direction. If a detachment determination of the sensor units 10 from the bumpers 15 is not performed, two sensor units 10 may be arranged on the bumpers 15 in alignment with the vehicle width direction.

In the above embodiment, a case where the sensor units 10 are mounted on the bumpers 15 is assumed to determine the detachment state of each bumper 15 based on the pitch angle θp or the roll angle θr detected by the tilt sensor 12 provided to each sensor unit 10. In this regard, the sensor units 10 do not necessarily have to be mounted on the bumpers 15, and for example, may be mounted on a front grille (equivalent to the predetermined member) of the vehicle. In this case, a detachment state of the front grille is determined based on the pitch angle θp and the roll angle θr detected by the tilt sensor 12 provided to each sensor unit 10 mounted on the front grille.

In the above embodiment, the sensor units 10 are provided with the ultrasonic sensors 11 as sensors for detecting an object. In this regard, the sensors for detecting an object do not have to be limited to the ultrasonic sensors 11 and may be lidars, millimeter wave radars, or cameras.

In the above embodiment, the ultrasonic sensor 11 and the tilt sensor 12 are attached to the same substrate 13. In this regard, they do not have to be attached to the substrate 13 and the ultrasonic sensor 11 and the tilt sensor 12 may be attached to a housing.

The determination of detachment of the bumper 15 according to the above embodiment may be performed while the vehicle is stopped (the engine is stopped). While the engine is driven, the sensor units 10 mounted on the bumpers 15 also vibrate in association with vibration of the engine and may affect the pitch angle θp and the roll angle θr detected by the tilt sensor 12 with a risk of causing an error. To cope with this situation, determination of detachment of the bumper 15 while the vehicle is stopped allows inhibition of an error in the pitch angle θp and the roll angle θr detected by the tilt sensor 12, leading to more accurate determination of detachment of the bumper 15.

In the above embodiment, the object detection process based on the position information of an object detected by the ultrasonic sensor 11 having a risk of erroneously recognizing the road surface as an object is stopped if the sensor unit 10 is detached from the bumper 15 or the bumper 15 is in the full-detachment state or the one-side detachment state. In this regard, operation itself of the ultrasonic sensor 11 having a risk of erroneously recognizing the road surface as an object may be stopped.

In the above embodiment, on the condition that no detached sensor unit 10 has been determined to be among the sensor units 10 mounted on the bumper 15, the detachment state of the bumper 15 is determined based on the roll angle θr or the pitch angle θp detected by the tilt sensor 12. In this regard, the determination of detachment of the sensor unit 10 from the bumper 15 may be performed after the determination of the detachment state of the bumper 15 or the determination itself of detachment of the sensor unit 10 from the bumper 15 may not be performed.

In the above embodiment, the detachment state of the bumper 15 is classified into the full-detachment state, the semi-detachment state, and the one-side detachment state to separately determine whether the bumper 15 applies to the states. In this regard, the detachment state of the bumper 15 does not necessarily have to be classified into the three states, and for example, without strictly classifying the detachment state of the bumper 15, the bumper 15 may be determined to be detached if the roll angle θr detected by the tilt sensor 12 is greater than the third predetermined angle or the pitch angle θp is greater than the second predetermined angle. As another example, the detachment state of the bumper 15 may be classified into, for example, a full-detachment state and a one-side detachment state to separately determine whether the state of the bumper 15 applies to any one of the two states.

In the above embodiment, whether the sensor unit 10 has been detached from the bumper 15 is determined based on whether the difference between the pitch angle θp detected by a certain tilt sensor 12 and the pitch angles θp detected by the other tilt sensors 12 is greater than the first predetermined value. In this regard, whether the sensor unit 10 has been detached from the bumper 15 may be determined based on whether the difference between the roll angle θr detected by a certain tilt sensor 12 and the roll angles θr detected by the other tilt sensors 12 is greater than a second predetermined value. As another example, whether the sensor unit 10 has been detached from the bumper 15 may be determined based on whether the difference between the pitch angle θp detected by a certain tilt sensor 12 and the pitch angles θp detected by the other tilt sensors 12 is greater than the first predetermined value and the difference between the roll angle θr detected by a certain tilt sensor 12 and the roll angles θr detected by the other tilt sensors 12 is greater than the second predetermined value.

In the above embodiment, if there is the tilt sensor 12 having detected the roll angle θr greater than the third predetermined angle, the bumper 15 is determined to be in the one-side detachment state and the portion on the sensor unit 10 side provided with the tilt sensor having detected the roll angle θr greater than the third predetermined angle is detached. In this regard, the method of determining the one-side detachment state of the bumper 15 is not limited to the above. If the bumper 15 is in the one-side detachment state, the roll angles θr detected by the tilt sensors 12 are assumed to be different between in the sensor unit 10 mounted on the detached part of the bumper 15 and in the sensor units 10 mounted on the undetached part. Accordingly, if a deviation of the roll angles θr detected by two of the respective tilt sensors 12 provided to the sensor units 10 is greater than a predetermined deviation, a determination may be made as the one-side detachment state where either side of the bumper 15 is detached.

If either the left or right side of the bumper 15 is detached, the roll angle θr detected by the tilt sensor 12 provided to the sensor unit 10 mounted on the detached side of the bumper 15 is assumed to be greater than the roll angle θr detected by the tilt sensor 12 provided to the sensor unit 10 mounted on the undetached side. Accordingly, if the one-side detachment state is determined where either the left or right side of the bumper 15 is detached by the determination method according to the present modification, the tilt sensor 12 having detected the roll angle θr of a greater value is specified among the two tilt sensors 12 determined to have the deviation of the roll angles θr greater than the predetermined deviation. This allows a determination that the portion on the side having the sensor unit 10 mounted thereon provided with the specified tilt sensor 12 is detached.

In the above embodiment, the bumper 15 is determined to be in the full-detachment state if the pitch angles θp detected by the respective tilt sensors 12 provided to the sensor units 10 mounted on the bumper 15 are greater than the first predetermined angle. In addition, the bumper 15 is determined to be in the semi-detachment state if the pitch angles θp detected by the respective tilt sensors 12 provided to the sensor units 10 mounted on the bumper 15 are greater than the second positive predetermined angle and smaller than the first predetermined angle.

Even when the bumper 15 is in the full-detachment state or the semi-detachment state, the sensor units 10 mounted on the bumper 15 are assumed to uniformly incline in accordance with the detachment state of the bumper 15. In this sense, the ECU 20 does not have to determine whether the bumper 15 is in the full-detachment state or in the semi-detachment state based on the pitch angles θp detected by the respective tilt sensors 12 provided to the sensor units 10 mounted on the bumper 15. That is, the bumper 15 may be determined whether to be in the full-detachment state or in the semi-detachment state based on, by defining a predetermined sensor unit 10 (hereinafter, referred to as a predetermined unit) in advance among the sensor units 10 mounted on the bumper 15, the pitch angle θp detected by the tilt sensor 12 provided to the predetermined unit. In this case, all pitch angles θp detected by the tilt sensors 12 provided to the sensor units 10 mounted on the bumper 15 do not have to be verified, and it is thus possible to simplify the determination process of the full-detachment state and the semi-detachment state of the bumper 15.

However, the determination method according to the present modification has a risk of erroneously determining failure of the predetermined unit being detached from the bumper 15 as detachment of the bumper 15. More specifically, there is a risk of erroneously determining failure of the predetermined unit being detached from the bumper 15 as the full-detachment state of the bumper 15. Taking care of such a case, as in the above embodiment, prior to determination of the detachment state of the bumper 15, whether there is the sensor unit 10 having been detached from the bumper 15 among the sensor units 10 mounted on the bumper 15 is determined. This allows inhibition of confusing the failure of the predetermined unit being detached from the bumper 15 with the determination of detachment of the bumper 15.

Figure 6:
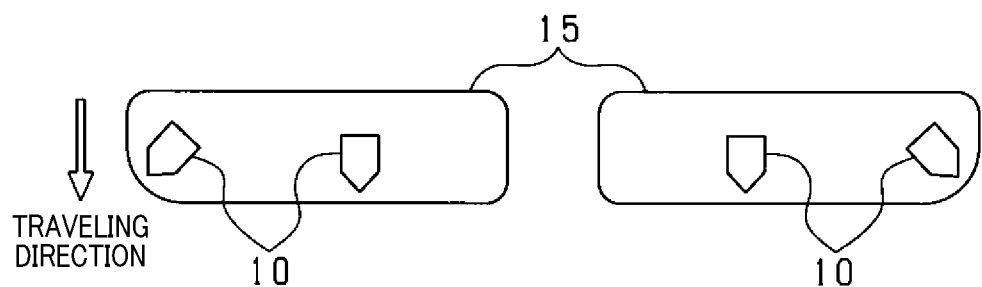
FIG. 6 is a schematic diagram illustrating a plan view of a state where sensor units are mounted on a bumper configured to be separated into left and right.

The sensor units 10 according to the above embodiment may be, as illustrated in FIG. 6, applied to a configuration where the bumper 15 is provided so as to be separated into left and right. In this case, the detachment states of the respective left and right bumpers 15 can be determined in the same manner as in the above embodiment based on the pitch angles θp and the roll angles θr detected by the tilt sensors 12 provided to the sensor units 10 mounted on the bumpers 15.

The determination of the one-side detachment state of the bumper 15 may be changed to the following determination method. In some cases, the road surface where the vehicle is located is inclined with reference to the width direction, and in association with the inclination of the road surface, the own vehicle may be inclined (rolled) with reference to the width direction. In this case, both the tilt sensors 12 provided to the sensor units 10 mounted on both the left and right bumpers 15 are assumed to detect greater roll angles θr in comparison with the case in the horizontal state. In this case, the roll angles θr detected by the tilt sensors 12 mounted on both the left and right bumpers 15 are assumed to have an identical reference direction. In such a situation, separate determination of the one-side detachment state for the left and right bumpers 15 may cause erroneous determination that both the left and right bumpers 15 are in the one-side detachment state.

Accordingly, if a determination is made that there is the tilt sensor 12 having detected the roll angle θr greater than the third predetermined angle in one of the respective bumpers 15 on the left and right, whether there is the sensor unit 10 provided with the tilt sensor 12 having detected the roll angle θr of the magnitude approximately equivalent to that of the roll angle θr detected by the tilt sensor 12 is in the other bumper 15 is further determined. If this determination is negative, the bumper 15 having the sensor unit 10 mounted thereon provided with the tilt sensor 12 having detected the roll angle θr greater than the third predetermined angle is determined to be in the one-side detachment state. Meanwhile, if this determination is positive, the own vehicle is determined to be inclined with reference to the width direction. This allows inhibition of confusing the inclination of the own vehicle with reference to the width direction with the one-side detachment state of the bumper 15.

In the configuration where the bumpers 15 are separated into left and right, the detachment state of the bumper 15 may be determined by comparing the pitch angles θp or the roll angles θr detected by the tilt sensors 12 provided to the sensor units 10 mounted on the left and right bumpers 15.

For example, if one of the bumpers 15 is in the semi-detachment state or the full-detachment state, the pitch angle θp detected by the tilt sensor 12 provided to the sensor unit 10 mounted on the bumper 15 is assumed to be greater in comparison with the pitch angle θp detected by the tilt sensor 12 provided to the sensor unit 10 mounted on the normal bumper 15. More specifically, the bumper 15 can be determined to be in the semi-detachment state or in the full-detachment state based on the difference between the pitch angle θp detected by the tilt sensor 12 provided to the sensor unit 10 mounted on the bumper 15 in the detachment state and the pitch angle θp detected by the tilt sensor 12 provided to the sensor unit 10 mounted on the normal bumper 15. In this situation, the difference is greater in the full-detachment state of the bumper 15 than the semi-detachment state of the bumper 15.

Accordingly, if the difference between the pitch angles θp detected by the tilt sensors 12 provided to the sensor units 10 mounted on the left and right bumpers 15 is greater than a first threshold, the bumper 15 having the sensor unit 10 mounted thereon provided with the tilt sensor 12 having detected the greater pitch angle θp is determined to be in the full-detachment state. Meanwhile, if the difference between the pitch angles θp detected by the tilt sensors 12 provided to the sensor units 10 mounted on the left and right bumpers 15 is smaller than the first threshold and is greater than a second threshold set smaller than the first threshold, the bumper 15 having the sensor unit 10 mounted thereon provided with the tilt sensor 12 having detected the greater pitch angle θp is determined to be in the semi-detachment state.

When one of the bumpers 15 is in the one-side detachment state, the roll angle θr detected by the tilt sensor 12 provided to the sensor unit 10 mounted on the bumper 15 is assumed to be greater in comparison with the roll angle θr detected by the tilt sensor 12 provided to the sensor unit 10 mounted on the normal bumper 15. Accordingly, if the difference between the roll angles θr detected by the tilt sensors 12 provided to the sensor units 10 mounted on both bumpers 15 is greater than a third threshold, the bumper 15 having the sensor unit 10 mounted thereon provided with the tilt sensor 12 having detected the greater pitch angle θp is determined to be in the one-side detachment state.

Although the present disclosure has been described with reference to the embodiments, the present disclosure is understood not to be limited to the above embodiments and structures. The present disclosure includes various modifications and alterations within the scope of equivalence. In addition, the scope and the spirit of the present disclosure include various combinations and configurations and also other combinations and configurations with only one element, more elements, or fewer elements added thereto.

The invention claimed is:

1. An object detection apparatus applied to a vehicle having a sensor unit mounted on a predetermined member provided to the vehicle, the sensor unit being provided with an object detection sensor that detects position information of an object present around the vehicle and a tilt sensor that detects a tilt angle as inclination with respect to a predetermined direction, the object detection apparatus comprising:
 a controller configured to:
  determine a detachment state of the predetermined member based on the tilt angle detected by the tilt sensor,
  perform a process of detecting the object based on the position information of the object detected by the object detection sensor in accordance with the determined detachment state of the predetermined member,
  calculate a distance from the vehicle to the object based on the position information of the object and a position of the vehicle,
  determine whether the distance from the vehicle to the object is within a predetermined distance, and
  in response to determining that the distance from the vehicle to the object is within the predetermined distance, transmit a control signal to at least one of a warning device and a braking device.

2. The object detection apparatus according to claim 1, wherein the controller is further configured to change, in accordance with the detachment state of the predetermined member, a content of the process of detecting the object using the position information of the object detected by the object detection sensor.

3. The object detection apparatus according to claim 1, wherein
 the predetermined direction is a longitudinal direction of the vehicle,
 the tilt sensor detects a tilt angle downward with reference to the longitudinal direction of the vehicle as a pitch angle, in which the pitch angle is positive, and
 the controller is further configured to make a determination, for a state in which the pitch angle detected by the tilt sensor is greater than a first positive predetermined angle, as a full-detachment state where fixation of the predetermined member to the vehicle has been lost.

4. The object detection apparatus according to claim 3, wherein
 the predetermined direction is the longitudinal direction of the vehicle,
 the tilt sensor detects a tilt angle downward with reference to the longitudinal direction of the vehicle as the pitch angle, in which the pitch angle is positive, and
 the controller is further configured to make a determination, for a state in which the pitch angle detected by the tilt sensor is greater than a second positive predetermined angle set smaller than the first positive predetermined angle and is smaller than the first positive predetermined angle, as a semi-detachment state where an upper side of the predetermined member has detached from the vehicle.

5. The object detection apparatus according to claim 4, wherein the controller is further configured to:
 change, in accordance with the detachment state of the predetermined member, a content of the process of detecting the object using the position information of the object detected by the object detection sensor, wherein
 limit, for a state in which the predetermined member is determined to be in the semi-detachment state, a detection upper limit distance to be shorter which is an upper limit of a distance for detecting the object based on the position information of the object detected by the object detection sensor as the pitch angle detected by the tilt sensor is greater.

6. The object detection apparatus according to claim 3, wherein the controller is further configured to:
 change, in accordance with the detachment state of the predetermined member, a content of the process of detecting the object using the position information of the object detected by the object detection sensor, wherein
 stop, for a state in which the predetermined member is determined to be in the full-detachment state, the process of detecting the object based on the position information of the object detected by the object detection sensor.

7. The object detection apparatus according to claim 1, wherein
 the predetermined member has a plurality of sensor units mounted in alignment with a width direction of the vehicle,
 the predetermined direction includes the width direction of the vehicle,
 tilt sensors of the plurality of sensor units detect a tilt angle downward with reference to the width direction of the vehicle as a roll angle, in which the roll angle is positive, and
 the controller is further configured to make a determination, for a state in which any of the tilt sensors detect a roll angle greater than a third positive predetermined angle, as a one-side detachment state where a portion of the predetermined member is detached which is on a side of the sensor unit provided with the tilt sensor having detected a value greater than the third positive predetermined angle.

8. The object detection apparatus according to claim 7, wherein the controller is further configured to:
change, in accordance with the detachment state of the predetermined member, a content of the process of detecting the object using the object detection sensor provided to the sensor units mounted on the predetermined member, wherein
stop, for a state in which the predetermined member is determined to be in the one-side detachment state, the process of detecting the object based on the position information of the object detected by the object detection sensor provided to the sensor unit mounted on the portion of the predetermined member on the detached side.

9. The object detection apparatus according to claim 1, wherein
the predetermined member has a plurality of sensor units mounted in alignment with a width direction of the vehicle,
the predetermined direction includes the width direction of the vehicle,
tilt sensors of the plurality of sensor units detect the tilt angle downward with reference to the width direction of the vehicle as a roll angle, in which the roll angle is positive, and
the controller is further configured to make a determination, for a state in which a deviation of roll angles detected by two of the respective tilt sensors provided to the sensor units is greater than a predetermined deviation, as a one-side detachment state where a left or right side of the predetermined member is detached.

10. The object detection apparatus according to claim 9, wherein the controller is further configured to determine, for a state in which making a determination as the one-side detachment state where the left or right side of the predetermined member is detached, that a portion on a side having the sensor unit provided with the tilt sensor having detected a roll angle of a greater value among two tilt sensors mounted on the predetermined member is detached.

11. The object detection apparatus according to claim 1, wherein
the predetermined member has three or more sensor units mounted in alignment with a width direction of the vehicle, and
the controller is further configured to determine, for a state in which a difference between a tilt angle detected by one tilt sensor and tilt angles detected by other plurality of tilt sensors is greater than a predetermined value, that the sensor unit provided with the one tilt sensor is detached.

12. The object detection apparatus according to claim 11, wherein for a state in which the sensor unit is determined as being detached, the process of detecting the object based on the position information of the object detected by the object detection sensor provided to the sensor unit determined as being detached is stopped.

13. The object detection apparatus according to claim 1, wherein a plurality of predetermined member are provided to the vehicle.

14. The object detection apparatus according to claim 1, wherein
the object detection sensor is an ultrasonic sensor which transmits an ultrasonic wave as a transmission wave and receives a reflected wave of the transmission wave, and
the predetermined member is a bumper.

* * * * *